United States Patent Office 3,576,035
Patented Apr. 20, 1971

3,576,035
ALCOHOLYSIS OF THE SILICON-SILICON BOND
William H. Atwell, Midland, Mich., assignor to Dow Corning Corporation, Midland, Mich.
No Drawing. Continuation-in-part of application Ser. No. 797,695, Feb. 7, 1969. This application June 2, 1969, Ser. No. 829,703
Int. Cl. C07f 7/04, 7/18
U.S. Cl. 260—448.8                 10 Claims

ABSTRACT OF THE DISCLOSURE

The alcoholysis of polysilanes which involves employing palladium-on-charcoal as the catalyst. For example, one can mix a disilane of the formula $$(CH_3)_3Si—Si(CH_3)_3$$

with an alcohol, e.g., $CH_3OH$, in the presence of palladium-on-charcoal at room temperature. Hydrogen is evolved and an alkoxysilane of the formula $$(CH_3)_3SiOCH_3$$

is obtained. Heretofore, there was no available transition-metal catalyst for catalyzing alcoholysis of hexamethyldisilane.

---

This application is a continuation-in-part of U.S. application, Ser. No. 797,695, filed Feb. 7, 1969, now abandoned.

This invention relates to the cleavage of silicon-silicon bonds to form desired alkoxysilanes by employing palladium-on-charcoal as the catalyst.

Heretofore, it has been known that metal halides such as platinum chloride or palladium chloride could serve as catalysts for the cleavage of silicon-silicon bonds; however, as a necessary requirement, olefin, phenyl, or hydrogen groups had to be present on the silicon atom. It has been found that palladium-on-charcoal is a substantially more active catalyst under like conditions, and in addition, serves effectively as a ctalyst for a broader range of reactions. For example, the silicon-silicon bond is not restricted to olefin, phenyl, or hydrogen substitution and completely alkylated silanes amongst many others may be readily cleaved to provide desired alkoxysilanes.

In accordance with the above, the present invention relates to a method for cleaving silicon-silicon bonds to form alkoxysilanes comprising (A) contacting
  (1) a polysilane of the formula

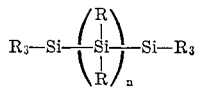

in which
    R is selected from the group consisting of an alkyl radical of from 1 to 6 carbon atoms inclusive, a phenyl radical, a hydrogen atom, an alkoxy radical of from 1 to 6 carbon atoms inclusive, an alkenyl radical of from 2 to 6 carbon atoms inclusive, and a 3,3,3-trifluoropropyl radical,
    $n$ has a value of 0 or more, with
  (2) an alcohol of the formula R'OH, in which R' is an alkyl radical of from 1 to 6 carbon atoms inclusive, and
(B) heating the above admixture to a temperature of at least 25° C., in the presence of
  (3) at least 0.5 percent based upon the weight of the polysilane (1) of palladium-on-charcoal, and thereafter
(C) recovering the corresponding alkoxysilane.

As noted above, R can be an alkyl radical of from 1 to 6 carbon atoms inclusive such as the methyl, ethyl, propyl, isopropyl, butyl, t-butyl, amyl, and the hexyl radical.

R may also be an alkoxy radical of from 1 to 6 carbon atoms inclusive such as the methoxy, ethoxy, propoxy, isopropoxy, butoxy, and the hexoxy radical among others.

In addition, R can be an alkenyl radical of from 2 to 6 carbon atoms inclusive such as the vinyl, allyl, methyllyl, $CH_3CH_2CH_2CH=CH—$, and the $$CH_3CH_2CH_2CH_2CH=CH—$$

radical.

R can also be a hydrogen atom, a phenyl radical, and a 3,3,3-trifluoropropyl radical.

R' can be an alkyl radical of from 1 to 6 carbon atoms inclusive, illustrative examples of which have been expressed for R above.

As noted above, $n$ has a value of 0 or more.

The palladium-on-charcoal catalyst (3) is a commercially available material which is well known in the art. It is normally provided in a powdered or pellet form and consists of palladium, i.e., 5 percent or greater, on a charcoal support. Charcoal supports containing 5 percent or more palladium have been found to be suitable herein, however, in view of economical considerations and the like, a support containing from 5 percent to 15 percent palladium is particularly suitable.

The ingredients (1), (2), and (3) may be mixed in any feasible manner. For example, one may physically mix the polysilane (1) and the alcohol (2) and thereafter add the catalyst (3) at an appropriate temperature. One may also add the individual ingredients in a suitable container or one may even simply add the polysilane (1) to a suspension of the catalyst and alcohol. In any event, it is apparent that the ingredients merely be contacted in a generally suitable fashion most convenient under the circumstances.

Stoichiometric amounts or less of the polysilane (1) and alcohol (2) may be used; however, to best effectuate the purposes of the present invention, it is preferred that an excess of the alcohol (2) be employed. The use of excess amounts of the alcohol enhances the solubility of the polysilane and hence, it has been found that the reaction rate is accordingly substantially increased.

The method described herein may be readily conducted at room temperature; however, depending upon the choice of the alcohol, e.g., t-butyl alcohol, it may be preferable to employ a moderate temperature to facilitate the reaction. A temperature of from at least 25° C. to about 100° C. has been found to be satisfactory.

The following examples are illustrative only and are not intended to limit the invention which is properly delineated in the appended claims.

EXAMPLE 1

The alcoholysis reactions were carried out in a 50 ml. round-bottomed flask which had a side arm equipped with a Teflon stop-cock for the addition and removal of reactants. The flask was also equipped with a condensor, nitrogen inlet, and magnetic stirrer. To insure against any potential hazard, the above apparatus was initially purged with nitrogen prior to contacting the reactants. The desired mixture of the polysilane and alcohol was then added to the flask by means of a syringe. The course of the reaction was followed by gas chromatography and the structure of the products were confirmed by comparison with known standards. The results obtained (using a variety of polysilanes and alcohols) are provided in the following Table I.

TABLE I

| Polysilane [1] (moles) | Alcohol (moles) | Catalyst,[2] percent | Products obtained [3] |
|---|---|---|---|
| $(CH_3)_3Si-Si(CH_3)_3$ | (0.0148) $CH_3OH$ (0.0296) | 1.0 | $(CH_3)_3SiOCH_3$ |
| $(CH_3)_3Si-Si(CH_3)_3$[4] | (0.049) $CH_3CH_2-CH_2OH$ (0.098) | 1.5 | $(CH_3)_3SiOCH_2CH_2CH_3$ |
| $(CH_3)_3Si-Si(CH_3)_3$[4] | (0.049) $CH_3\underset{CH_3}{\overset{H}{C}}-OH$ (0.098) | 1.5 | $(CH_3)_3SiO\underset{CH_3}{\overset{H}{C}}-CH_3$ |
| $(CH_3)_3Si-Si(CH_3)_3$[4] | (0.027) $CH_3-\underset{CH_3}{\overset{CH_3}{C}}OH$ (0.054) | 1.5 | $(CH_3)_3SiO-\underset{CH_3}{\overset{CH_3}{C}}-CH_3$ |
| $CH_3O-\underset{CH_3}{\overset{CH_3}{Si}}-\underset{CH_3}{\overset{CH_3}{Si}}-OCH_3$ | (0.01) $CH_3OH$ (0.03) | 1.0 | $\underset{CH_3}{\overset{CH_3}{Si}}(OCH_3)_2$ |
| $(CH_3O)_2\underset{CH_3}{Si}-\underset{CH_3}{Si}(OCH_3)_2$ | (0.0074) $CH_3OH$ (0.021) | 1.0 | $CH_3Si(OCH_3)_3$ |
| $(CH_3O)_3Si-Si(OCH_3)_3$ | (0.023) $CH_3OH$ (0.046) | 1.0 | $Si(OCH_3)_4$ |
| $C_6H_5\underset{CH_3}{\overset{CH_3}{Si}}-\underset{CH_3}{\overset{CH_3}{Si}}C_6H_5$ | (0.015) $CH_3OH$ (0.03) | 0.65 | $C_6H_5\underset{CH_3}{\overset{CH_3}{Si}}-OCH_3$ |
| $(C_6H_5)(C_6H_5)\underset{}{\overset{CH_3}{Si}}-Si(CH_3)_3$ | (0.01) $CH_3OH$ (0.02) | 1.5 | $(C_6H_5)(C_6H_5)\overset{CH_3}{Si}OCH_3$ and $(CH_3)_3SiOCH_3$ |
| $F_3CCH_2CH_2\underset{CH_3}{\overset{CH_3}{Si}}-\underset{CH_3}{\overset{CH_3}{Si}}CH_2CH_2CF_3$ | (0.01) $CH_3OH$ (0.03) | 1.0 | $F_3CCH_2CH_2\underset{CH_3}{\overset{CH_3}{Si}}OCH_3$ |
| $H\underset{CH_3}{\overset{CH_3}{Si}}-\underset{CH_3}{\overset{CH_3}{Si}}H$ | (0.015) $CH_3OH$ (0.03) | 1.0 | $(CH_3)_2Si(OCH_3)_2$ |
| $CH_3\underset{CH_3}{\overset{CH_3}{Si}}-\underset{CH_3}{\overset{CH_3}{Si}}-\underset{CH_3}{\overset{CH_3}{Si}}-CH_3$ | (0.01) $CH_3OH$ (0.05) | 2.0 | $(CH_3)_3SiOCH_3$ and $(CH_3)_2Si(OCH_3)_2$ |

[1] Unless otherwise indicated, all reactions were carried out at room temperature.
[2] Percent of 5% palladium-on-charcoal based upon the weight of the polysilane.
[3] Essentially quantitative yields of alkoxysilanes and hydrogen were obtained in all cases.
[4] Reaction carried out at 78° C.

EXAMPLE 2

When the following polysilanes and alcohols were reacted in stoichiometric amounts and at room temperature in accordance with the procedures set forth at Example I, the products indicated below were obtained.

| Polysilane | Alcohol | Product |
|---|---|---|
| $(CH_3CH_2CH_2O)_2Si-Si-(OCH_2CH_2CH_3)_2$ with $CH_3$, $CH_3$ | $CH_3CH_2CH_2OH$ (2.0% catalyst) | $CH_3Si(OCH_2CH_2CH_3)_3$ |
| $(CH_3CH_2CH_2CH_2CH_2CH_2O)-\underset{}{\overset{CH_3}{Si}}-\underset{}{\overset{CH_3}{Si}}-(OCH_2CH_2CH_2CH_2CH_2CH_3)_2$ | $CH_3CH_2CH_2CH_2-CH_2CH_2OH$ (4.0% catalyst) | $CH_3Si(OCH_2CH_2CH_2CH_2-CH_2CH_3)_3$ |
| $(CH_3O)_2(CH_3CH_2CH_2CH_2CH_2-CH_2)Si-Si-(CH_2CH_2CH_2-CH_2CH_2CH_3)(OCH_3)_2$ | $CH_3OH$ (3.5% catalyst) | $CH_3CH_2CH_2CH_2CH_2CH_2Si-(OCH_3)_3$ |
| $CH_2=CHCH_2(CH_3)_2Si-Si(CH_3)_2CH_2CH=CH_2$ | $CH_3OH$ (0.5% catalyst) | $CH_2=CHCH_2(CH_3)_2SiOCH_3$ |
| $CH_2=CHCH_2CH_2CH_2CH_2-(CH_3)_2Si-Si-(CH_3)_2CH_2-CH_2CH_2CH_2CH=CH_2$ | $CH_3OH$ (2.5% catalyst) | $CH_2=CHCH_2CH_2CH_2CH_2-(CH_3)_2SiOCH_3$ |
| $(CH_3)_3Si-\underset{CH_3}{\overset{CH_3}{Si}}-\underset{CH_3}{\overset{CH_3}{Si}}-Si(CH_3)_3$ | $CH_3OH$ (2.0% catalyst) | $(CH_3)_3Si(OCH_3)+(CH_3)_2Si(OCH_3)_2$ |
| $(C_6H_5)(CH_3O)_2Si-Si(OCH_3)_2(C_6H_5)$ | $CH_3OH$ (1.0% catalyst) | $C_6H_5Si(OCH_3)_3$ |

That which is claimed is:
1. A method for cleaving silicon-silicon bonds to form alkoxysilanes comprising
(A) contacting
  (1) a polysilane of the formula

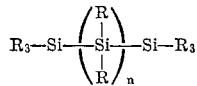

in which
  R is selected from the group consisting of an alkyl radical of from 1 to 6 carbon atoms inclusive, a phenyl radical, a hydrogen atom, an alkoxy radical of from 1 to 6 carbon atoms inclusive, an alkenyl radical of from 2 to 6 carbon atoms inclusive, and a 3,3,3-trifluoropropyl radical, $n$ has a value of 0 or more, with
  (2) an alcohol of the formula R'OH, in which R' is an alkyl radical of from 1 to 6 carbon atoms inclusive, and
(B) heating the above admixture to a temperature of at least 25° C., in the presence of
  (3) at least 0.5 percent based upon the weight of the polysilane (1) of palladium-on-charcoal, and thereafter
(C) recovering the corresponding alkoxysilane.

2. The method as recited in claim 1 in which $n$ has a value of 0.

3. The method as recited in claim 2 in which R' is a methyl radical.

4. The method as recited in claim 2 in which R' is an ethyl radical.

5. The method as recited in claim 3 in which the polysilane is of the formula

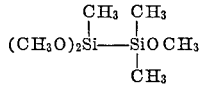

6. The method as recited in claim 3 in which the polysilane is of the formula

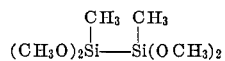

7. The method as recited in claim 3 in which the polysilane is of the formula $$(CH_3O)_3Si\text{---}(OCH_3)_3$$

8. The method as recited in claim 3 in which the polysilane is of the formula $$(CH_3)_3Si\text{---}Si(CH_3)_3$$

9. The process as recited in claim 3 in which the polysilane is of the formula

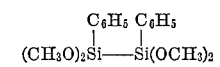

10. The process as recited in claim 3 in which the polysilane is of the formula

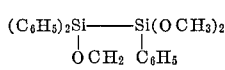

References Cited

UNITED STATES PATENTS 2,881,197  4/1959  Kuriyagawa et al. _ 260—448.8R
3,478,079  11/1969  Atwell _____ 260—448.8R TOBIAS E. LEVOW, Primary Examiner
P. F. SHAVER, Assistant Examiner U.S. Cl. X.R.
260—448.2D, 448.2E